July 25, 1967     F. S. CAROTHERS, JR     3,333,259
VACUUM OPERATED OIL LEVEL INDICATOR
Filed July 8, 1964
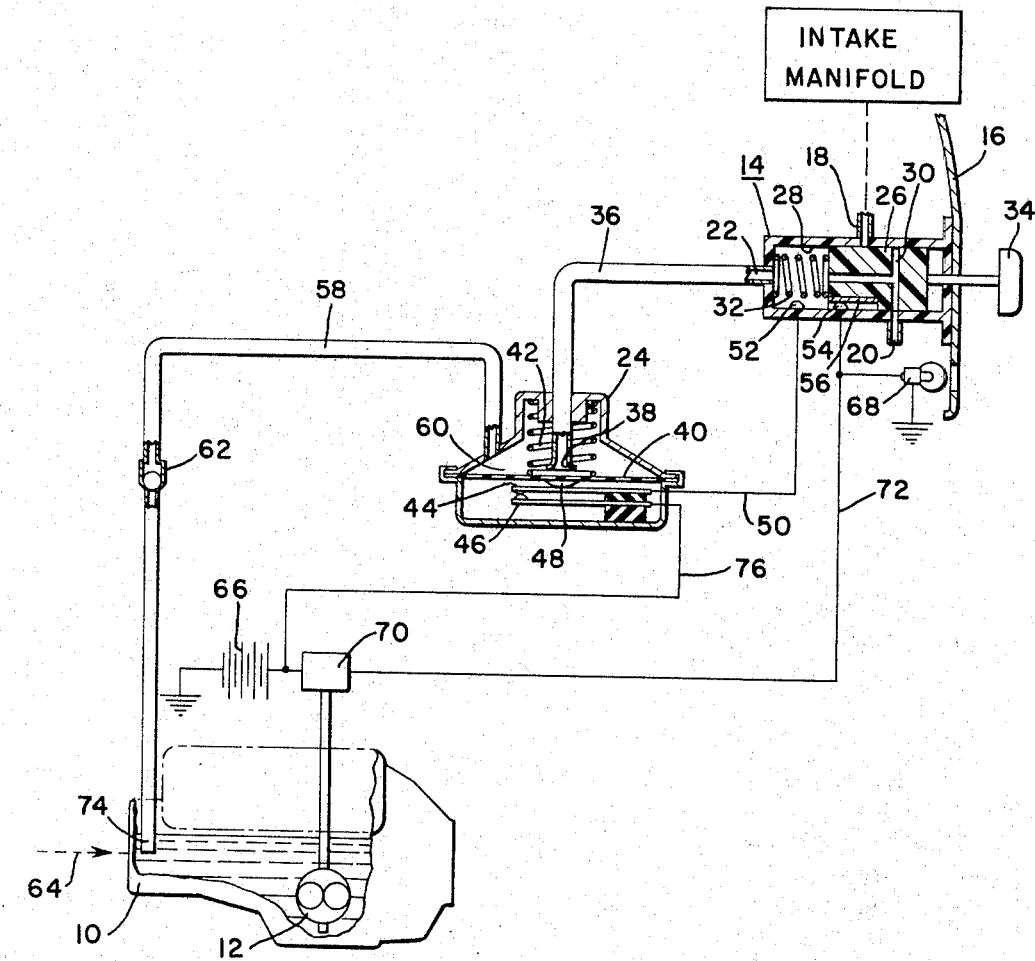
INVENTOR.
Frank S. Carothers, Jr.
BY
C. R. Meland
His Attorney

United States Patent Office 3,333,259
Patented July 25, 1967

3,333,259
VACUUM OPERATED OIL LEVEL INDICATOR
Frank S. Carothers, Jr., Anderson, Ind., assignor to General Motors Corporation, Detroit, Mich., a corporation of Delaware
Filed July 8, 1964, Ser. No. 381,197
4 Claims. (Cl. 340—244)

This invention relates to indicating devices and more specifically to a vacuum-operated oil level indicator for motor vehicles.

The amount of pressure in an oil system for a vehicle does not directly indicate the amount of oil available for lubrication in that system. In internal combustion engines, it is important to maintain a quantity of oil in the lubricating system which will insure adequate lubrication and a quantity of oil in the oil reservoir to insure the fact that a pump disposed therein pumps only oil and not a mixture of oil and air. Also, certain oil lubricating systems have a submerged pump which requires an amount of oil in the reservoir which completely covers the pump during periods of operation.

It is an object of the present invention to provide an oil level indicating system that will transmit to a vehicle operator an indication of a low oil supply.

It is another object of the present invention to provide an improved oil level indicating device for use with motor vehicles that is vacuum operated and electrically controlled.

It is still another object of the present invention to provide an improved oil level indicator that is operative only when a check of the system is desired.

It is a further object of the present invention to provide an improved oil level indicator that utilizes the same electrical components as a typical oil pressure indicator.

Further objects and advantages of the present invention will be apparent from the following description, reference being had to the accompanying drawing wherein a preferred embodiment of the present invention is clearly shown.

In the drawing:

In the single figure drawing, the subject invention is illustrated diagrammatically with some parts shown in section and others with parts broken away.

Referring now to the drawing, an oil reservoir 10 is shown having a quantity of oil disposed therein. A pump 12 is submerged in the oil contained in the reservoir 10 and is adapted to provide oil under pressure to various parts of an internal combustion engine, not shown.

A control valve, generally designated by the numeral 14, is illustrated as being mounted in any well-known fashion on a panel 16 that might be, for example, the dashboard of a motor vehicle. An inlet 18 from an intake manifold, not shown, is disposed through one wall of the valve 14. An outlet 20 to the atmosphere from the valve 14 is designed to keep the system at atmospheric pressure when an oil level indication is not being sensed. An outlet 22 from the valve 14 provides a pressure communication to a pressure responsive device 24 to be hereinafter described. A piston 26 is slidably disposed in a bore 28 of the valve 14 and has a series of internally contained passages 30 adapted to selectively provide a communication between the indicating system and the atmosphere or, in the alternative, the indicating system and the intake manifold of the vehicle. A spring 32 serves to bias the piston 26 into a position where the indicating system is in communication with the atmosphere. A push button 34 is made available to the operator of the vehicle in the driving compartment and engages the piston 26 in any well-known manner. Pressure on the button 34 against the pressure of the spring 32 will position the passage 30 so that the intake manifold of the vehicle is in pressure communication with the outlet 22.

A pressure line 36 connects the outlet 22 with the pressure responsive device 24 and has a flared end 38 disposed in close proximity to a diaphragm 40. The diaphragm 40 is normally biased away from the flared end 38 of the line 36 by a spring 42. In another portion of the pressure responsive device 24 on the opposite side of the diaphragm 40 are disposed a series of contacts 44 and 46. The contact 44 is normally biased away from contact 46 but is held in engagement therewith by an element 48 carried by the diaphragm 40 and held against the contact 44 by the spring 42. The contact 44 is electrically connected through a lead 50 to a contact 52 carried on an inside surface of the bore 28. A similarly disposed but spaced contact 54 is also disposed in the bore 28. The contacts 52 and 54 are adapted to be bridged by a conductive element 56 carried by the piston 26 as it moves into a position where it provides a fluid communication path between the inlet 18 and the outlet 22.

A pressure line 58 provides a path for pressure response between a chamber 60 formed on one side of the diaphragm 40 and the oil reservoir 10. A check valve 62 of common design is not directly responsive to vacuum pressure but operates substantially as a float check valve when oil is drawn from the reservoir up into the line 58 when the device becomes operative. An arrow 64 denotes the minimum acceptable level for oil in the reservoir 10. It is noted that an end 74 of the line 58 is suspended in the reservoir 10 down to the level indicated by the arrow 64.

A battery 66 is electrically disposed between ground and a tell-tale lamp 68. It is noted that two possible paths for current flow are established between the battery 66 and the light 68. One of these paths for current is made continuous by a pressure operated switch 70 through a line 72 when the pump pressure decreases below a predetermined level. This is accomplished in any well-known manner and serves to alert the driver of a vehicle when the oil pressure is low. Another path for current flow from the battery 66 to the light 68 is provided through the contacts 44 and 46 and the contacts 52 and 54. This path for current flow is made continuous in a manner to be hereinafter described.

In operation, the subject device is disposed in any appropriate position in a vehicle which allows the system connections to be made as previously described. Normally, the tell-tale lamp 68 is not energized. If the operator desires to check the oil level in the reservoir 10, the button 34 is fully depressed. The movement of the piston 26 in response to the button 34 has a dual purpose. First, it provides an electrical bridge between the spaced contacts 52 and 54 as the element 56 engages them and, secondly, a path for the communication of vacuum from the inlet 18 to the outlet 22 is provided by the movement of the passage 30 into an operative position. In this manner, a vacuum pressure is immediately felt in the chamber 60 and in the line 58 communicating with the chamber 60. If the end 74 of the line 58 is suspended below the then existing oil level in the reservoir 10, an amount of oil will be drawn into the line 58 and, at the same time, a negative pressure is exerted on the diaphragm 40. Depending on system design, one situation would allow the weight of the oil in the line 58 to be drawn up to a point where it is equal to the force of the spring 42 and the diaphragm 40 will be drawn into a position where it shuts off the flared end 38 of the line 36. As the diaphragm moves, the contact 44 will separate from the contact 46. In another situation, with a check valve installed, the check valve 62 would shut off the supply of oil from the reservoir 10 and, thereafter, the diaphragm 40 would move into sealing engagement with the flared end 38 of the line 36.

As previously stated, the contact 44 is normally biased away from the contact 46 and the movement of the diaphragm 40 toward the flared end 38 of the line 36 will allow the contact 44 to go out of engagement with the contact 46. This is the situation when a sufficient oil level, that is, a level of oil higher than the minimum acceptable oil level, is present in the reservoir 10. It is readily seen that, under these conditions, although the contacts 52 and 54 have been bridged by the element 56, the contacts 44 and 46 have separated and represent an open in the circuit to the lamp 68 from the battery 66. Presuming the oil pressure in the system to be normal, the pressure responsive switch 70 is likewise open and the tell-tale lamp 68 is not incandescent. When the oil level is seen by the vehicle operator to be normal, the knob 34 is released and the spring 32 drives the piston 26 back to another extreme of movement wherein the line 36 communicates with the outlet 20 to the atmosphere through the passage 30. The vacuum in the system is thereby relieved and the diaphragm 40 and its element 48 are driven towards the contact 44 by the spring 42 and the check valve 62 allows the oil to return to the reservoir 10.

If the oil level in the reservoir 10 is below the predetermined minimum acceptable level, the previously described movement of the piston 26 will take place during a test of the circuit but the pipe end 74 will be disposed above the level of oil in the reservoir 10 and only air will be drawn through the line 58. This leak from the chamber 60 through the line 58 will result in no movement of the diaphragm 40 and, consequently, the contacts 44 and 46 will remain in engagement. Under this condition of operation, an electrical circuit will be established from the battery 66 through a lead 76 to the engaged contacts 44 and 46, on through the lead 50, through the bridged contacts 52 and 54 to the tell-tale lamp 68. A path for current flow will therefore exist and the lamp 68 will become incandescent, alerting the vehicle operator to the fact that a low oil level exists in the reservoir 10. When this information has been transmitted, pressure is relieved from the button 34, and the inlet 18 from the intake manifold is closed and the system is returned to a condition where the light 68 can become incandescent only through a lowering of the oil pressure from the pump in the manner previously described.

It is clear then that the subject invention operates on the push-to-test principle and, consequently, the tell-tale lamp indication, while used in both systems, cannot be confused with an indication of a low oil pressure.

The subject device has utility in providing an indication of the level of liquid in a container. In view of the isolation of the liquid from the electrical apparatus associated with the device, it is clear that gasoline or other liquids might be checked using this same principle. Simple adjustments might be made in the size of the line into the pressure chamber 60 or the reservoir 10 or in the type of pressure source while still keeping within the spirit of the inventive concept. For example, the line 58 could be disposed in a sight gauge arrangement and, in another installation, the separation of the contacts 44 and 46 might be substituted for by a rheostat which could give a series of readings of fluid level rather than an either/or type indication possible with the system disclosed.

It is likewise obvious that a positive pressure could be presented to the portion of the pressure responsive device on the opposite side of the diaphragm disclosed as being pressurized and a negative pressure created in another chamber thereby to draw the liquid through the line 58. However, in the preferred embodiment, vacuum pressure is used to actuate the subject device because of the ready availability of vacuum from the engine intake manifold.

While the embodiment of the present invention, as herein disclosed, constitutes a preferred form, it is to be understood that other forms might be adopted.

What is claimed is as follows:

1. A condition indicator for an automobile lubricating system having a pump and a normally open pressure switch associated therewith, said condition indicator comprising: valve means having an inlet from the intake manifold and an outlet remotely positioned from said inlet, said valve means including a piston normally biased in one direction and movable to bring the inlet into fluid communication with the outlet; pressure responsive means including a spring loaded diaphragm in pressure communication with the outlet of the valve means, said pressure responsive means including switching means in normally closed disposition being responsive to movement of the diaphragm to an open position; a pressure line connecting the pressurized portion of the pressure responsive means and an oil reservoir, said diaphragm further providing a means for blocking fluid flow between the outlet of said valve means and said pressure line, an opposite end of the pressure line being disposed at a predetermined level in the oil reservoir corresponding to a minimum acceptable level of oil therein; indicating means energizable by movement of the piston in the valve means and including a circuit established between a tell-tale lamp and an electrical source through the switching means formed as a portion of the pressure responsive means; said pressure responsive means being positioned to keep energized the circuit established between the tell-tale lamp and the electrical source as the piston of the valve means is moved in one direction when the oil level in the reservoir has dropped below the opposite end of the pressure line, the pressure responsive means adapted to deenergize the circuit established by movement of the piston between the tell-tale lamp and the electrical source when the oil level in the reservoir is above the minimum acceptable level, said tell-tale lamp being alternately energized directly by a closing of said pressure switch if pump pressure decreases below predetermined limits.

2. An oil condition indicator for a motor vehicle having a lubricating system and a reservoir therefor, said oil level indicator comprising: a valve body having an inlet in pressure communication with the intake manifold of the automobile and an outlet at a remote point from the inlet, said valve body having a piston responsive to pressure from one end and adapted to selectively bring the inlet into fluid communication with the outlet, said piston including a switching means energizable as the piston slides towards one extreme of movement; pressure responsive means including a spring loaded diaphragm normally biased in one extreme of movement in fluid communication with the outlet of the valve body, said pressure responsive means including a plurality of electrical contacts biased towards the open position but normally held engaged by the spring loaded diaphragm as it is disposed in one extreme of movement by the spring during periods when it is not pressurized; a fluid line in pressure communication with the intake manifold through the pressure responsive means when the valve means communicates pressure from the inlet to the outlet of the valve means, said diaphragm further providing a means for blocking fluid flow between the outlet of said valve means and said pressure line, one end of the fluid line being disposed at a predetermined minimum acceptable oil level in the reservoir; and indicating means including an electrical circuit established on an electrical power source through the contacts of the pressure responsive means and the valve means to a tell-tale lamp, said circuit being made continuous by a movement of the piston sliding towards one extreme of movement in the valve body to light the tell-tale lamp, said circuit being deenergized by releasing of the plurality of contacts in the pressure responsive means as a diaphragm moves against the spring tension during periods of time when the oil level is above the minimum acceptable predetermined level, the tell-tale lamp remaining energized to indicate a low oil level in the reservoir when the piston is driven towards one extreme of movement to bring the fluid line in the reservoir into fluid communication with the intake manifold of the vehicle and the fluid level in the reservoir is not high enough to cover the end of the pressure line thereby making the diaphragm of the pressure responsive means non-responsive to intake manifold pressure.

3. An oil level indicator according to claim 2 wherein the fluid line between the pressure responsive means and the oil reservoir includes a check valve to prevent the passage of oil from the reservoir into the pressure responsive means.

4. An oil level indicator according to claim 2 wherein the piston slidably disposed in the valve body is spring loaded into a position where the inlet and the outlet from the valve body are isolated, said piston being slidable into a position where the inlet and the outlet are in fluid communication by means of pressure exerted on one side of the piston by an operator of the vehicle.

References Cited

UNITED STATES PATENTS

| 1,977,969 | 10/1934 | McIntosh | 340—244 |
| 2,497,029 | 2/1950 | Korte et al. | 340—270 |
| 2,588,761 | 3/1952 | Raby | 340—244 X |
| 3,196,389 | 7/1965 | Heidner | 340—270 X |

NEIL C. READ, *Primary Examiner.*

D. MYER, *Assistant Examiner.*